United States Patent [19]

Cantoni

[11] Patent Number: 4,885,082
[45] Date of Patent: Dec. 5, 1989

[54] MULTIPLE LUBRICATING OIL FILTER FOR INTERNAL COMBUSTION ENGINES, WITH A MEMBER FOR MONITORING THE DEGREE OF CLOGGING OF THE FILTRATION SURFACE

[75] Inventor: Angelo Cantoni, Rome, Italy

[73] Assignee: Ital Idee s.r.l. an Italian Limited Liability Company, Rome, Italy

[21] Appl. No.: 179,872

[22] Filed: Apr. 11, 1988

[30] Foreign Application Priority Data

Apr. 13, 1987 [IT]  Italy ................................ 47839 A/87

[51] Int. Cl.$^4$ ............................................ B01D 35/14
[52] U.S. Cl. ...................................... 210/90; 210/130; 210/132; 210/136; 210/168; 210/440; 210/416.5; 123/196 A; 123/196 S
[58] Field of Search ...................... 210/85, 87, 90, 130, 210/132, 168, 416.5, DIG. 17, 440, 136, 416.5; 123/196 A, 196 S; 116/268; 340/607

[56] References Cited

U.S. PATENT DOCUMENTS 2,879,892  3/1959  Frakes ..................................... 210/90
3,644,915  2/1972  McBurnett ...................... 340/239 F
4,265,748  5/1981  Villani et al. ........................ 210/132
4,366,837  1/1983  Roettgen .............................. 137/557
4,655,914  4/1987  Wada ................................... 210/168

FOREIGN PATENT DOCUMENTS 2235837  1/1974  Fed. Rep. of Germany ...... 210/136

Primary Examiner—W. Gary Jones
Assistant Examiner—Matthew Savage
Attorney, Agent, or Firm—Fleit, Jacobson, Cohn, Price, Holman & Stern

[57] ABSTRACT

The filter according to the invention comprises an outer casing which is provided with an end cover having a connection to the engine lubrication circuit. The outer casing houses a first filter pack or element positioned to be passed through by the engine lubricating oil. A pressure relief valve, which allows the oil to bypass the first filter pack or element in the case of excessive pressure drop, is provided. The pressure relief valve cooperates with a piston element associated with an electrically conducting spring to establish electrical connection between an electrical contact and a part of the filter casing. A second filter pack or element is positioned to filter part of the oil which the pressure relief valve allows to pass when a high pressure drop in the oil flow through the first filter pack or element occurs.

5 Claims, 1 Drawing Sheet

MULTIPLE LUBRICATING OIL FILTER FOR INTERNAL COMBUSTION ENGINES, WITH A MEMBER FOR MONITORING THE DEGREE OF CLOGGING OF THE FILTRATION SURFACE

BACKGROUND OF THE INVENTION

Internal combustion engines are provided with a forced-circulation lubrication circuit which maintains a lubricating oil film between all mechanical parts undergoing relative movement, in order to reduce friction between the parts and to remove and dissipate the heat generated.

With the passage of time, impurities accumulate in the lubricating oil. These impurities consist mainly of metal particles deriving from the wear of the engine sliding members, carbon particles produced by the fuel and by the combustion of seeping oil, and mineral powders, generally siliceous and calcareous, derived from the dust suspended in the engine intake air.

In order to eliminate such solid particles, which with the passage of time lead to considerable wear of the moving parts of the engine, a single filter cartridge is usually provided. The cartridge is generally in the form of a thin sheet metal casing containing a folded porous paper cylinder, together with a valve system for controlling the passage of oil.

These filters also comprise a pressure relief or bypass valve. The pressure relief or bypass valve assures oil feed to the engine even when the oil pressure downstream of the valve is insufficient, due either to operation of the engine at high speed or to clogging of the filter.

When the pressure relief or bypass valve opens it ensures correct lubrication, even if the filter is clogged. On the other hand, the valve also enables not only the oil but also the impurities contained in the oil to circulate through the engine members, to produce the damage mentioned previously.

It is therefore particularly important to determine the state of clogging of the oil filter in order to be able to replace it as soon as it has exceeded its designed operating state and before the pressure relief valve opens or before the oil passing through it undergoes a high pressure drop, without having to rely on an estimate of average life as in the case of filters known up to the present time.

The filter element currently used is generally not able to retain solid particles of less than 20 microns in size. Higher filtration power would lead to an excessive pressure drop in the oil as it passes through the filtration surface. It is, however, apparent that a filtration system able to retain solid particles of just a few microns in size would considerably reduce the wear of the moving engine parts.

Up to the present time the filtration methods used include the provision of a second filter element of greater filtration power than a first filter but traversed by only a certain proportion of the total oil flowing through the lubrication system. Thus, after a certain time, all the fluid will have passed through the second filter element without creating excessive pressure drop in the circuit.

The main problem with such a filtration method is that the second filtration surface, offering considerable flow resistance, is in parallel with a flow path offering negligible resistance.

It is therefore necessary to provide a pressure drop between the upstream and downstream sides of the second filtration surface to overcome the flow resistance provided by the filtration surface. This has been achieved up to the present time by dividing the outlet flow from a conventional filter into two paths, one directed to the engine and the other directed to a second filter of greater filtration power. The outlet pipe of the second filter returns the outlet flow to the oil sump so that the pressure drop between the pressurized circuit upstream of the second filter and the oil sump downstream of the second filter overcomes the resistance to flow through the filtration surface of the second filter.

This method is disadvantageous in that it leads to considerable complication of the lubrication circuit.

Also known are double filters having one inlet and two outlets. One outlet is directed to the engine and the other to the sump. The filter according to the present invention offers the advantages of this type of double-path filter without requiring modifications to the vehicle engine. These advantages are attained by means of a secondary path formed by a Venturi tube.

SUMMARY OF THE INVENTION

According to the present invention, a multiple lubricating oil filter for internal combustion engines is provided. A member for monitoring the degree of clogging of the filtration surface is also provided. The filter comprises an outer casing provided with an end cover connectable to the engine lubrication circuit and containing passages for an oil inlet and outlet. The filter houses a first filter pack or element positioned to be passed through by the oil. Also provided is a pressure relief valve which prevents the oil from passing through the filter pack if an excessive pressure drop is present. The relief valve is provided with means for closing an electric circuit if a high pressure drop in the oil flow through the first filter pack or element occurs. Also, connected in series with the first filter pack or element is a second filter pack or element arranged to be passed through by part of the oil present in the circuit and able to retain solid particles of smaller size than those retained by the first filter pack or element. The multiple filtration system is enclosed in a single outer casing having an end cover which can be connected to the engine lubrication circuit by a single oil inlet port and a single oil outlet port.

Considering the invention in greater detail, according to one embodiment of the invention, the pressure relief valve comprises a cylinder in which a compression spring biases a pressure relief valve towards a piston, which can slide against friction. One of the faces of the piston is in hydraulic communication with a region upstream of the first filter pack or element. The other face of the piston is in communication with a region downstream of the first filter pack or element with respect to the path of the oil through the filter. A pair of separated electrical contacts is provided, one of which is connected to a ground provided by the vehicle. The other contact is connected to an electrical conductor outside of the filter. The contacts are arranged to come into mutual electrical connection and close the circuit to connect the other electrical contact to the ground provided by the vehicle before the pressure relief valve reaches a point during its travel along the cylinder at which the oil is able to bypass the first filter pack or element. The travel of the relief valve is due to the existence of a pressure difference between the valve faces, which produces a thrust exceeding the resistance of the compression spring and the frictional resistance along the cylinder in which the piston slides, i.e., against forces which oppose sliding of the piston.

An instrument for indicating closure of the electrical contacts is permanently connected to the electrical conductor. The instrument activates a warning lamp located in a visually suitable position.

Downstream of the first filter pack or element there is provided a second filter pack or element arranged to retain impurities which have a size of just a few microns and which cannot be retained by the first filter pack or element.

The second filter pack or element is passed through by only part of the circulating oil. This prevents excessive oil flow resistance from occurring in the filtration system, as would happen if all the oil were to pass through the second filter pack or element.

After a certain amount of oil circulation through the filtration system, all the lubricating oil will have passed through the second filter pack or element, so that only solid particles having a size of less than a micron will remain suspended in the circulating oil.

The second filter pack or element is passed through by part of the oil flowing downstream of the first filter pack or element. The oil is returned into the same pipe but slightly further downstream. The flow resistance of the second filtration surface is overcome by inducing a pressure drop where the two parallel circuits join together by means of a Venturi tube positioned in the oil return line to the engine.

The vacuum generated in the central region of the Venturi tube, to which the outlet pipe downstream of the second filtration surface is connected, makes it possible for the oil to also pass through the second filtration surface despite resistance of the second filtration surface to the oil flow.

BRIEF DESCRIPTION OF THE DRAWING

Further details will be apparent from the description given hereinafter with reference to the accompanying drawing, which illustrates one embodiment of the invention and in which.

DETAILED DESCRIPTION OF THE PREFERRED EMBODIMENT

Figure 1:
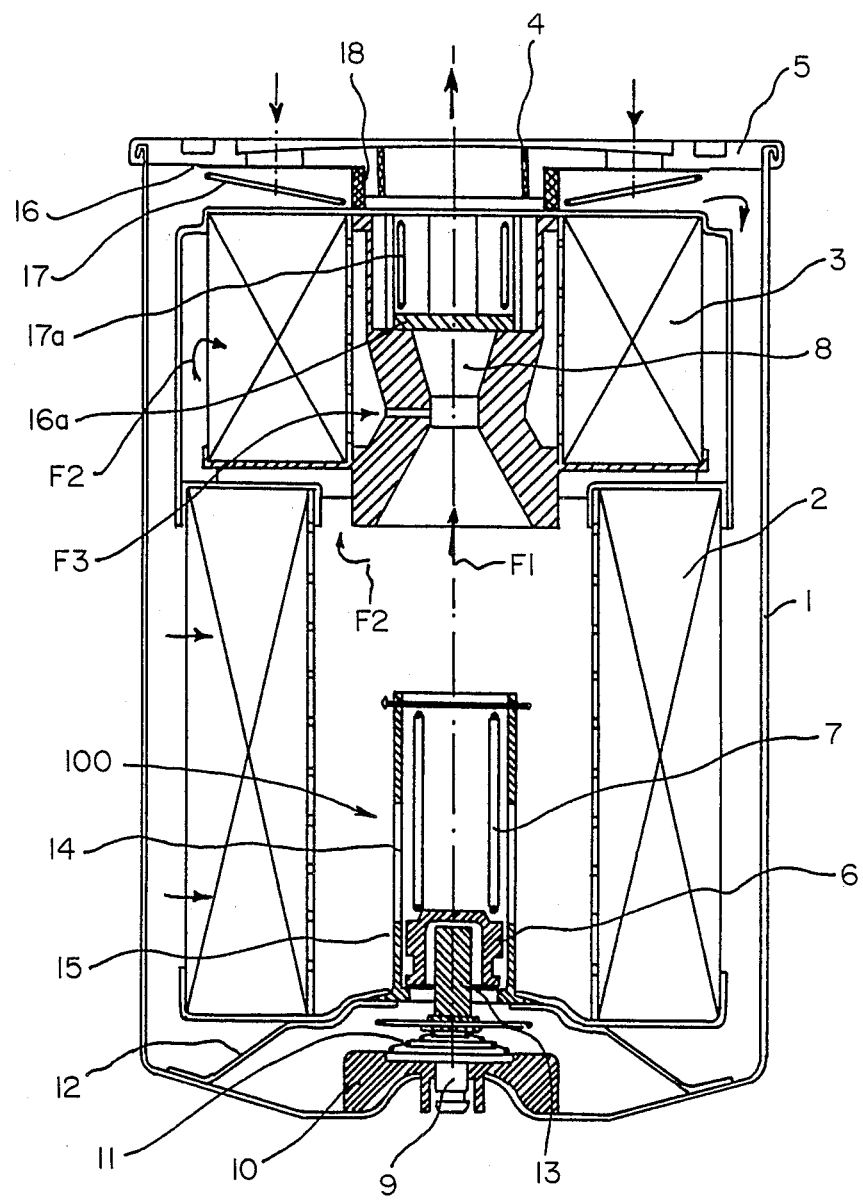
FIG. 1 is an overall sectional view of a filter according to the invention.

As shown in FIG. 1, the filter according to the invention includes an outer casing 1, usually of metal material, which encloses a first paper filter pack 2 and a second filter pack 3, and is connected to the engine lubrication circuit by way of threaded connector 4 on end cover 5 of the outer casing. The path of oil through the interior of the casing is diagrammatically shown by the arrows in the figure. The oil passes through the first paper filter pack, which is constructed with a large passage surface to minimize the pressure drop of the oil as the oil flows through the first paper filter pack.

Also provided is a pressure relief valve having an insulating material piston 6 and a piston element against which a return spring 7 acts. When open, the valve 100 allows the oil to pass freely through the filter by bypassing the filter pack 2, if the filter pack 2 is clogged. This assures that sufficient oil passes either by or through filter pack 2 in all cases.

The outer casing 1 is electrically connected to the vehicle, which provides a ground. On the end of the casing is provided an electrical contact 9 which is isolated from the ground provided by the vehicle by means of an insulating block 10 on which there rests an electrically conducting, metal spring 11. When the piston 6 is at rest, metal spring 11 remains isolated from metal electrical contact 12, which is electrically connected with the ground provided by the vehicle.

When excessive pressure upstream of the first filter pack 2 exceeds the force exerted by the spring 7, the pressure consequently causes sliding of the insulating-material piston 6, which is rigid with the piston element 13 on which the spring 11 rests. Electrical contact is then established between the metal point 12 and the spring 11.

Closure of the electrical circuit causes a warning lamp on the vehicle dashboard to light.

The piston element 13 is sized such that electrical contact occurs before the piston 6 reaches that point of its travel in the cylinder 15 at which the oil passage slots 14 are provided.

The flow downstream of the filter pack 2 divides into a main stream (indicated by arrow F1) which directly enters the Venturi tube 8 and a secondary stream (indicated by arrow F2) which passes through the second filtration surface 3 and rejoins (in the manner indicated by arrow F3) the main stream in the vacuum region of the Venturi tube 8.

To prevent the filter from emptying when the engine is at rest, which would result in delay in the return of the oil to circulation on restarting, two valves 16, 16a are provided. Movement of valves 16, 16a is opposed by the springs 17 and 17a respectively. The valves open only when the oil stream respectively entering and leaving the filter exceeds the slight pressure exerted by the springs 17, 17a.

A rubber ring 18 prevents any direct hydraulic connection between the inlet and outlet filter streams.

Various modifications can be made to the filter of the invention without leaving the scope of the invention as defined by the claims which follow.

I claim:

1. A multiple lubricating oil filter for internal combustion engines, with a member for monitoring the degree of clogging of the filtration surface, comprising:
    a casing provided with an end cover having means for connection to an engine lubrication circuit;
    a first filter pack placed inside said casing and positioned so as to be passed through by engine lubricating oil;
    a pressure relief valve arranged so as to allow the lubricating oil to bypass the first filter pack when an excessive pressure drop occurs, the pressure relief valve including a non-conducting piston element which rests on an electrically conducting spring arranged so as to establish an electrical point of contact between the spring and a metal electrical contact connected to a part of the filter casing; and
    a second filter pack being positioned inside said casing to filter part of the oil which the pressure relief valve allows to pass when the first filter pack is clogged.

2. A multiple filter according to claim 1, and further comprising a Venturi tube element in the lubricating oil return line to the engine, part of said oil returning to the engine passes through said second filter pack under the effect of the dynamic pressure difference between an inlet mouth of the Venturi tube and a vacuum region of the Venturi tube, so that a certain percentage of the oil returning to the engine is filtered by the second filter pack or element.

3. A multiple filter according to claim 1, and further comprising spring-operated non-return valves located in correspondence with a filter lubricating oil inlet port and with a filter lubricating oil outlet port, respectively.

4. A multiple filter according to claim 1, wherein the electrically conducting spring rests on an insulating support which is itself mounted on the filter casing in a sealed manner.

5. A multiple filter according to claim 1, and further comprising a preset spring to normally retain the pressure relief valve in its closed position, which enables lubricating oil to pass through the first filter pack.

* * * * *